G. WALKER.
PRICE SCALE.
APPLICATION FILED JUNE 1, 1908.

909,486.

Patented Jan. 12, 1909.
4 SHEETS—SHEET 1.

Witnesses:
S. H. Clarke
M. J. Ritte

Inventor.
George Walker.
By James Shepard
Atty.

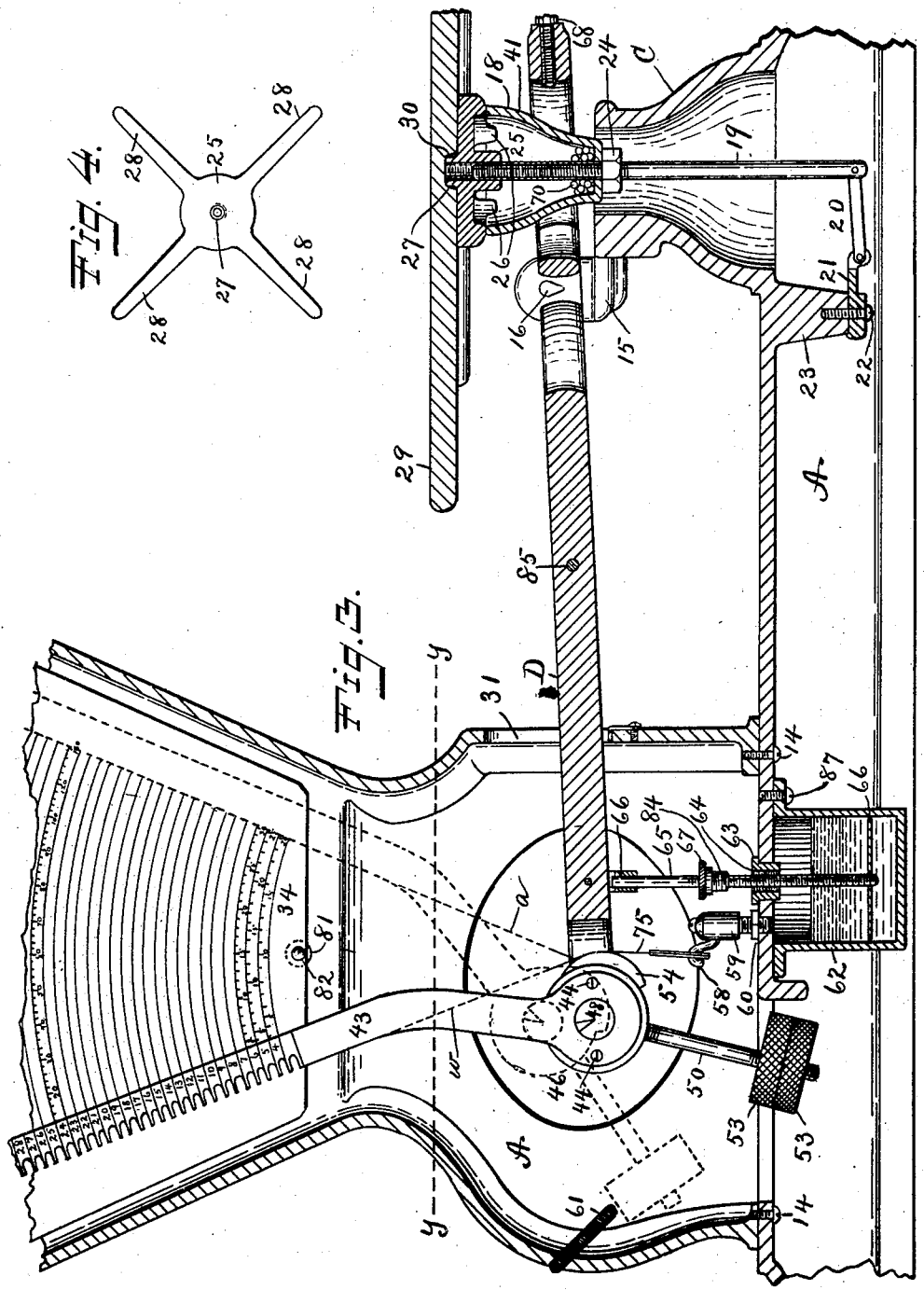

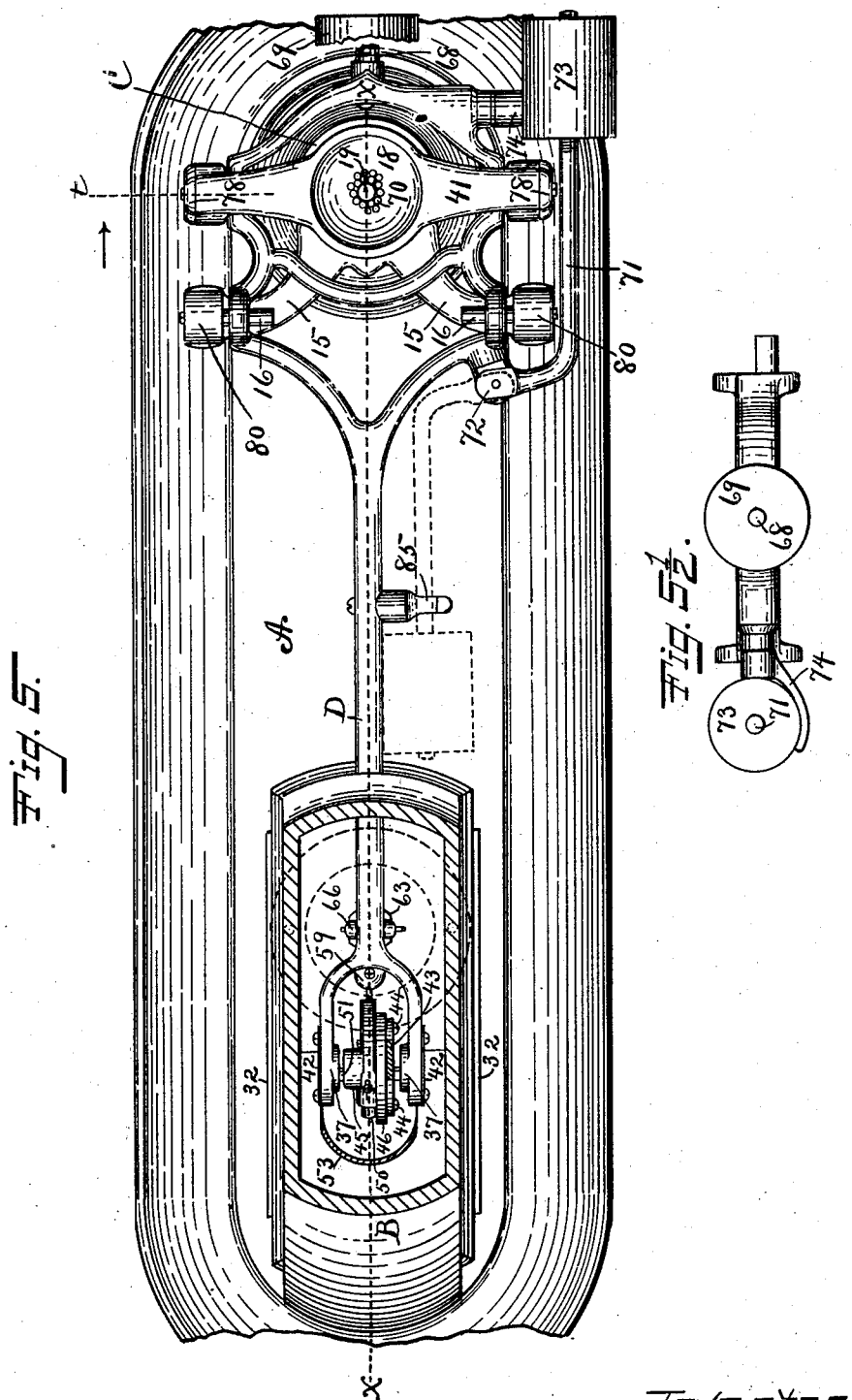

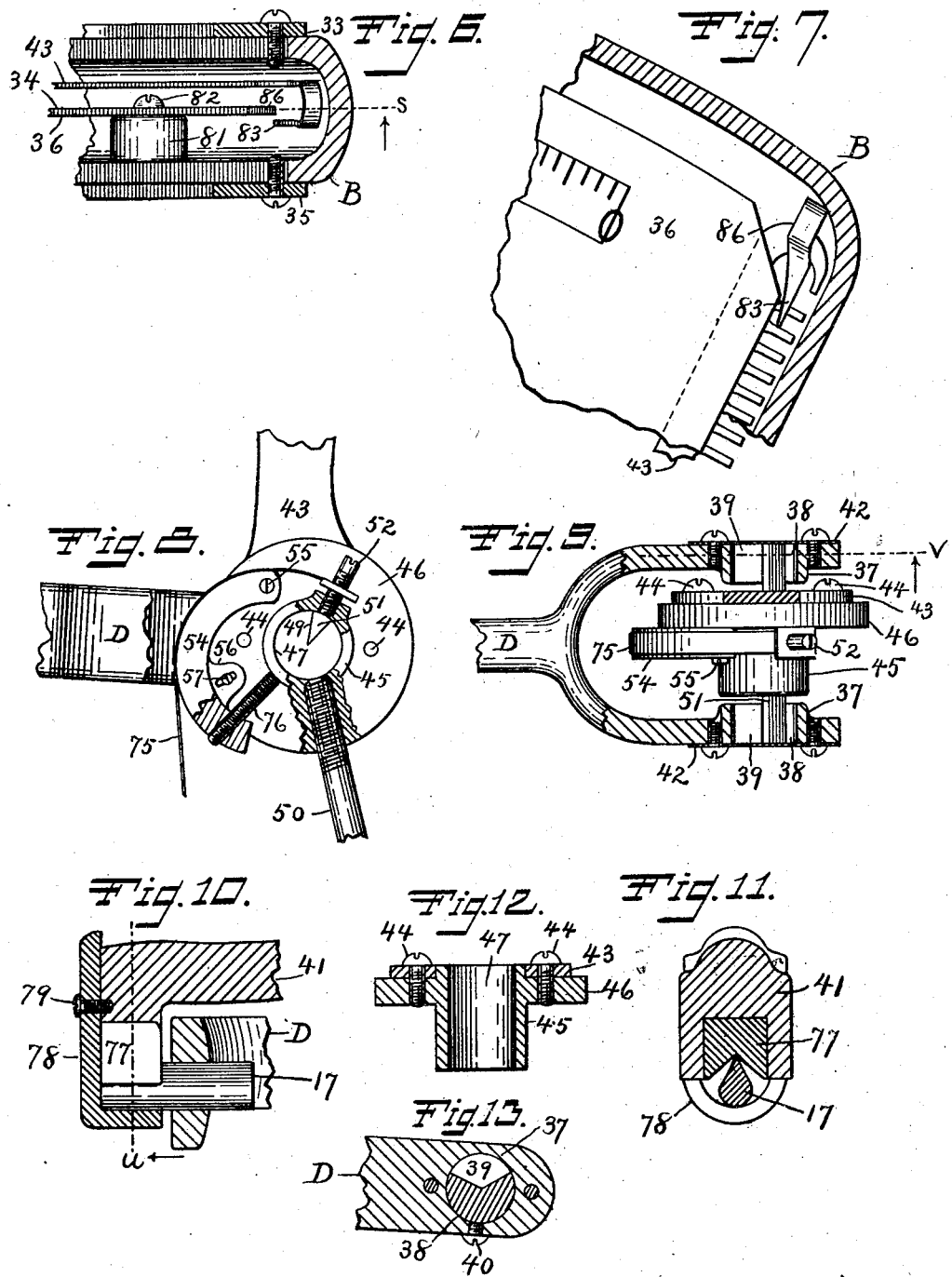

UNITED STATES PATENT OFFICE.

GEORGE WALKER, OF NEW BRITAIN, CONNECTICUT, ASSIGNOR TO LANDERS, FRARY AND CLARK, OF NEW BRITAIN, CONNECTICUT, A CORPORATION.

PRICE-SCALE.

No. 909,486.　　　　Specification of Letters Patent.　　　　Patented Jan. 12, 1909.

Application filed June 1, 1908. Serial No. 435,879.

*To all whom it may concern:*

Be it known that I, GEORGE WALKER, a citizen of the United States, residing at New Britain, in the county of Hartford and State of Connecticut, have invented certain new and useful Improvements in Price-Scales, of which the following is a specification.

My invention relates to improvements in price scales and the main objects of my improvement are simplicity and economy in construction with convenience and efficiency in use, particularly with reference to the connection of the scale beam with the swinging indicator whereby a much greater range of prices is indicated on a case of the same height.

Figure 1:
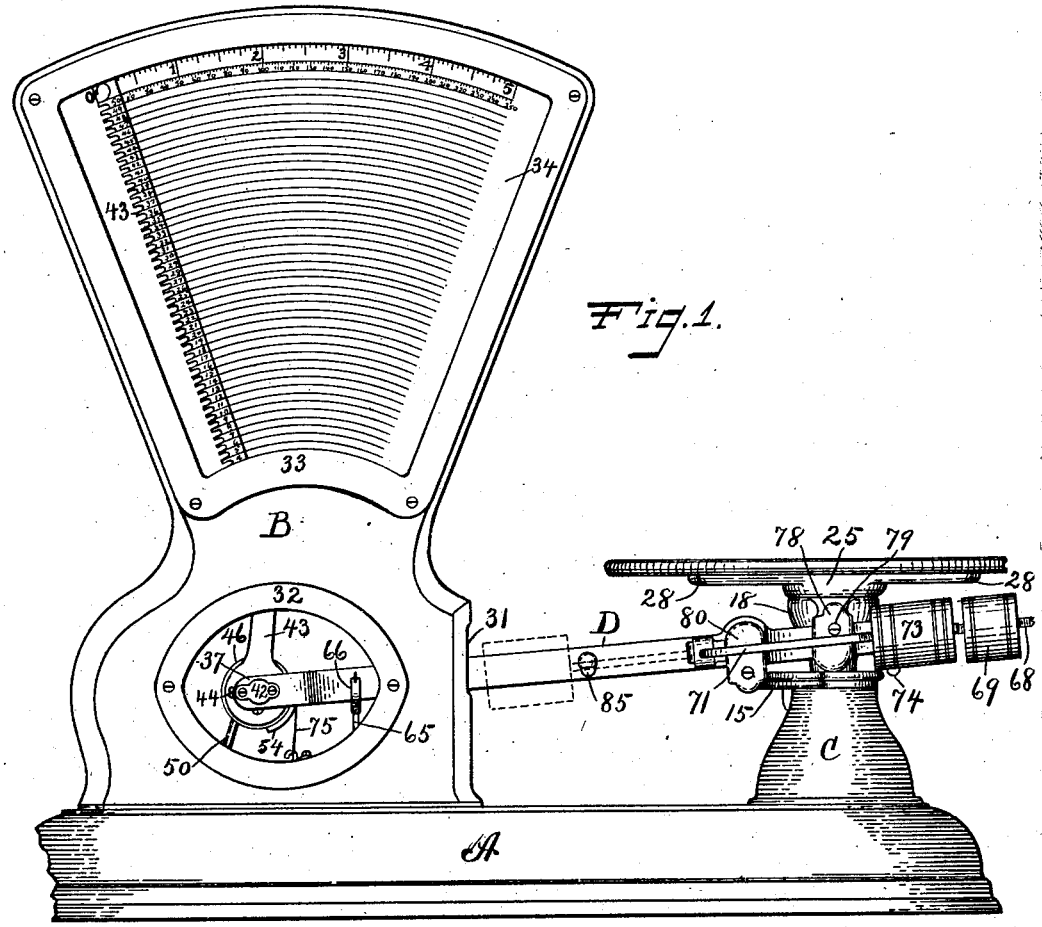
Figure 2:
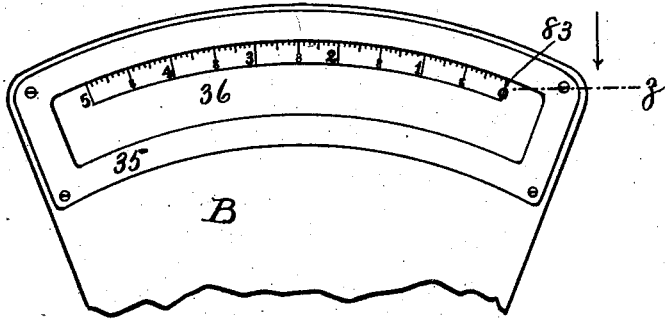

In the accompanying drawing:—Figure 1 is a front elevation of my indicator. Fig. 2 is a rear elevation of the upper portion of the case. Fig. 3 is mainly an enlarged vertical section on the line *x x* of Fig. 5, some of the parts being shown in elevation and some of the parts being broken away. Fig. 4 is a reduced plan view of the frame for the platform.
Fig. 5 is a horizontal section of the case and indicator on the line *y y* of Fig. 3, with a plan view of the other parts, the platform and platform frame being removed and some of the parts broken away. This view is on the same scale as Fig. 3. Fig. 5½ is an end view of the shorter end of the scale beam and attached parts. Fig. 6 is an enlarged horizontal section of the case on the line *z* of Fig. 2, together with a plan view of the dial and indicator, the latter being illustrated as moved to one side preparatory to removal. Fig. 7 is a vertical section of the case on the line *s* of Fig. 5, with an elevation of the dial and indicator, the latter being in the same position as in Fig. 6. Fig. 8 is a partial side elevation of the indicator hub and scale beam, some of the parts being broken out and shown in section. Fig. 9 is a sectional plan view of the scale beam fork and connected indicator hub.
Fig. 10 is a vertical section of one end of the platform cross-arm on the line *t* of Fig. 5. Fig. 11 is a transverse section of the same on the line *u* of Fig. 10. Fig. 12 is a horizontal section of the indicator hub. Fig. 13 is a horizontal section of one of the parallel arms of the scale beam fork on the line *v* of Fig. 9.

The case of my scale is mainly formed of two parts, the hollow base A and the upwardly projecting case extension B that is mounted on one end of the said base in any proper manner, as for example by screws 14, Fig. 3. The opposite end of the base is provided with a hollow post C from the upper end of which post the pivotal brackets 15 for the scale beam D extend laterally and longitudinally towards the case extension B. The scale beam D is provided with a frame like head carrying knife edge pivots 16, by which the said beam is pivotally mounted or fulcrumed in the brackets 15, as hereinafter more fully described. The said head of the scale beam also carries at its shorter end, knife edge pivots 17, Figs. 10 and 11, by means of which the platform cross-arm 41 is pivoted on the said head as hereinafter more fully described. The said cross-arm is provided with a cup 18 at the middle of its length through the center of which cup a platform supporting rod 19 extends vertically, the lower end of the said rod being connected with the base A by means of a link 20 that is pivoted by one end to the lower end of the said rod and by its other end to a malleable bracket 21 which is secured by a screw 22 to the under side of a stud 23 within the hollow base as shown in Fig. 3. The upper end of the platform supporting rod is screw threaded and provided with a set nut 24 which is first put on and then the cup 18 is screwed upon the said rod above the nut 24, the bottom of the cup being drilled and threaded for the reception of the said threaded upper end of the said rod 19. The platform frame is provided with a central hub 25 which is centrally drilled and threaded for being screwed upon the upper end of the supporting rod 19 while the lower side of the said hub is provided with lugs 26 that enter the inside of the cup 18 when the hub rests upon the upper edge of the said cup, as shown in Fig. 3. The top of the hub 25 is provided with a small central and upwardly projecting boss 27, while platfrom supporting arms 28 extend outwardly from the edge of the said hub with their upper faces from end to end level with the top of the said hub outside of the central boss. The platform 29 is preferably a marble slab or disk having a flat under face with a central recess or socket 30 to center the said platform on the hub 25, as shown in Fig. 3.

The case extension B is provided with an opening 31 in its edge at its lower part through which opening the longer end of the scale beam D extends. For convenience of gaining access to the interior and for an ornamental effect, I also provide the lower part of the case extension with side openings to which I apply suitably glazed frames 32, so that parts of the interior mechanism may be seen. The upper part of the case extension has the ordinary fan like form with a large opening and glazed frame 33 on one side for the computing dial 34, while the upper part of the other side has a smaller opening and glazed frame 35 for the rear dial 36, which shows to the customer the weight, but not the price. The two dials may be the opposite faces of the same sheet of metal or other material. With the exception of a greater range for the computing dial these dials are of the ordinary construction and arrangement. By means of the construction of the indicator and scale beam I am enabled to give on the dial the price of any given weight up to five pounds at prices ranging from 4 to 50 cents per pound consecutively. In other words, I give the price of any given weight at any one of forty seven different prices, whereas ordinarily less than thirty different prices are given on the dials of this class of scales. Ordinarily the scale beam is pivoted so as to carry its longer end downwardly when a weight is placed on the platform or in the pan. In my scale this end of the scale beam moves upwardly instead of downwardly. Ordinarily the swinging indicator and its pendulum counter balance are pivoted directly to the case at a point considerably above the longer end of the scale beam and consequently the center of the segments of concentric circles described by the indicator is necessarily at a considerable distance above that end of the scale beam even when in its highest position. In my scale, the indicator is pivoted directly to the longer end of the scale beam instead of to the case, and the center of the concentric circles, the segments of which are described by the said indicator is within the range of the longer end of the scale beam when in its lowest position, whereby I can bring the price dial much nearer to the longer end of the scale beam than in the ordinary scale.

The longer end of the scale beam is provided with a fork, the parallel arms of which fork are provided with hollow bosses 37 within which I place cylindrical blocks 38 having V shaped spaces 39 extending longitudinally therethrough. These blocks are secured and held in proper position therein by means of set screws 40, while the outer ends of the said blocks are covered by the caps 42. The body portion of the indicator 43 is of an ordinary construction, with its index edge notched with as many notches as there are circles of amounts to be indicated on the computing or price dial 34. The face of the indicator in the line of the said notches bears the prices per pound that the different circles are calculated for. The lower end of the indicator is secured by means of screws 44 to its hub 45, which hub is provided with a flange 46 to one side of which flange the indicator is placed. The hub 45 of the indicator is provided with a central bore 47 within which is placed a cylindrical block 48, having an acute angled V shaped slot 49 in one side for its whole length. The length of this block and the indicator hub 45 is such as to properly fit in between the two hollow bosses of the fork of the scale beam. A knife edge strip 51 that fits the slot 49 in the block 48 and is of a length to extend into the obtuse angled V shaped spaces in the pivotal blocks 38 of the scale beam, is inserted and secured in the indicator hub, the projecting ends of which strip form the knife edge pivots by which the indicator is mounted on the longer end of the scale beam. The block 48, is secured in the indicator hub by means of the screw threaded upper end of the rod 50 of the counter balance, which threaded end is screwed into a threaded hole in the indicator hub with its inner end impinging against the side of the said block. The knife edge strip 51 is held in place by means of a set screw 52, all as shown in Fig. 8. The outer end of the rod 50 is also screw threaded to receive, adjust and hold the counter balance. I prefer to form the counter balance in two parts 53, both screw threaded internally and screwed on the said rod for being adjusted thereon, while by making the counter balance of two parts the outer one may act as a set nut for more securely holding the complete counter balance against accidental movement on its rod.

One side of the flange of the indicator hub 45 is provided with a cam 54 which is in the form of a segmental piece secured thereto by a pivotal screw 55 at one end, while its opposite end is provided with an adjusting screw 76 that extends therethrough in a radial direction and bears on the side of the indicator hub. If desired the said cam may also be provided with a slotted lug 56, to receive a screw 57, Fig. 8, to prevent that end of the cam from accidentally moving outwardly. The outer edge or periphery of the cam is the effective periphery of the indicator hub. A tempered steel band 75 is secured by one end to the indicator hub by means of the set screw 52 which also serves the purpose of holding the knife edge strip. This band extends over the outer edge of the cam to the hook 58, to which its opposite end is secured, the said hook being mounted on an adjustable post 59, that is screwed into the top of the hollow base A of the case, the said post being held against accidental unscrewing by means of a set nut 60. When the indicator stands at zero as shown in Figs. 1, 2 and 3, the index edge of the indicator, (the left hand edge in Figs. 1 and 3,) is in alinement with that edge of the cam upon which the steel band bears, as indicated by broken line w Fig. 3, while the pivots and hub of the indicator are at the left of the said line, the lower end of the indicator being offset to permit the said index edge to be in alinement with the said cam edge. When a load is applied to the scale the longer end of the scale beam and the pivots of the indicator move upwardly so that the fulcrum of the indicator is constantly changing. The steel strip 75 pulling on the cam of the indicator hub as that hub is carried upwardly, the indicator is rocked on its pivots to move its body over the dials. The offset lower end and the cam compensates for this change of fulcrum so that notwithstanding said change the swinging movement and effective axis of the oscillating indicator is precisely the same as if it was mounted on a fixed fulcrum and each of the notches in the body of the indicator describes a segment of an approximate circle. In passing over the dial from zero to five pounds it changes its position from that shown by full lines in Fig. 3, to the position indicated therein by broken contour lines. The index edge is then on the broken line a which meets the line w at the edge of the cam just below the upper edge of the scale beam. The apex of the V formed by the junction of these lines is the center of the several segments described by the notches in the edge of the indicator. It is by this construction that the dial is carried downwardly nearer to the end of the scale beam and the greater range of prices may be placed on the dial in a scale of a given height. An adjustable stop 61, Fig. 3, is placed in the case to limit the upward movement of the counter-balance 53. The steel strip or operating band 75, and similar strips in other scales, constitutes means for operating the indicator through the movement of the scale beam.

To the under side of the top of the hollow base A near the longer end of the scale beam I secure a cup or dash pot 62, by means of two or more screws 87. The top of the base is bored and threaded to receive a filling cap 63, which may be removed for convenience of putting oil in the dash pot. This cap is provided with a screw threaded central bore 64. Through this bore a piston rod 65 extends to the lower end of which rod, a piston 66 is secured. The upper end of the piston rod is provided with a forked head 66, by means of which head the piston rod is pivotally connected to the scale beam. The piston rod is threaded at the portion which passes through the filling cap 63 and for some distance above the said cap and a nut 67 is screwed thereon. The exterior of this nut is threaded as at 84 to fit the internal thread of the filling cap. When the scale is in use the nut 67 is left unscrewed from the filling cap and the dash pot has the ordinary action of similar dash pots in checking the vibrations of the indicator. When the scale is to be moved from place to place the nut is screwed down on the piston rod and also into the threaded center of the filling cap, whereby the dash pot is closed to hold the oil or other liquid therein while at the same time the scale beam is held firmly in place so that it will not move up and down when handled.

The shorter end of the scale beam D is provided with a fixed screw threaded stud 68 in alinement with the main body of the said beam, upon which stud an adjustable counter poise or weight 69 is screwed and which can be changed in position by screwing it to or from the fulcrum of the scale beam so as to balance the same as desired. The cup 18 of the cross arm 41 may be used as a deposit for shot 70, or other load for adjusting the scale. I mount a horizontal swinging arm 71 on the head end of the scale beam by means of a pivot or pin 72, the outer or free end of the said arm being screw threaded and provided with a weight 73 that is centrally bored and threaded to fit the threaded outer end of the said arm. A bracket like hook 74 is secured to the scale beam in position to receive the said weight 73, when the arm is swung into position to carry this weight to the right of the scale beam fulcrum and consequently to the shorter end of the scale beam, as shown in Figs. 1 and 5, and hold the said arm and weight against accidental displacement. The scale is adjusted to the zero point when this shifting weight 73 is at the shorter end of the scale beam. Another bracket like hook 85 is mounted on one side of the longer end of the scale beam to receive and hold the said swinging arm and weight when the weight is shifted thereto by swinging it on its pivot pin 72, from the position shown by full lines in Figs. 1 and 5 to the position indicated by broken lines in the said figures. When in this latter position five pounds are added to the weight indicated on the dial. The range of the scale as shown when balanced at the zero point is only five pounds, but by shifting the five pound weight 73, to the longer end of the scale beam, the range is ten pounds. In other words anything less than five pounds cannot be weighed and just five pounds will balance the scale at zero. Above five pounds and less than ten pounds can be weighed, in which case five pounds must be added to the weight indicated on the dial in order to give the real weight. The weight and swinging arm bear on the bracket like hooks, with sufficient friction to make them stay in place and at the same time do not bear so hard but that they can be readily pulled off and on in changing their position. By being pivoted at a fixed point on the scale beam, the change from one position to the other of this five pound weight is always positive and can be quickly made.

Referring now to the specific construction of the knife edge pivots for the scale beam and platform cross arm, the scale beam D at its shorter end carries a pair of knife edge pivots 17, that have their bearings on the respective ends of the cross arm 41. These ends of the cross arm are recessed as shown in Figs. 10 and 11, to receive the grooved agate blocks 77, which blocks and the outer ends of the knife edge pivots 17 are covered at their ends by means of the caps 78 that are secured by screws 79 to the end faces of the said cross arm. The said caps also cover the grooved sides of the blocks and back edges of the knife edge pivots. The knife edge pivots 16 on which the scale beam is fulcrumed are of the same construction only they are the other side up, the pivots being carried by the scale beam while the bearings therefor are carried by the brackets 15 on the hollow post C of the base A. The outer ends and top of the pivots and agate blocks are covered in the same way by the caps 80 on the outer ends of the brackets 15, which caps are precisely the same as the caps 78 and therefore the construction shown in Figs. 10 and 11, makes it unnecessary to further illustrate the scale beam pivots and their bearings.

The dial 34 may be held in position in the case extension B in any proper manner, preferably by resting it at three points on projections 81 formed on one of the inner walls of the case extension and securing it thereon by means of screws 82, as best shown in Fig. 5. I prefer to form the rear pointer 83 for the rear dial 36 in one piece with the indicator 43, by doubling the metal on itself at the upper end of the said indicator, as shown in Figs. 6 and 7. In order to permit of inserting and removing the indicator from the case extension without removing the dial, I cut off the upper corner of the dial on the zero side, as at 86, Fig. 7, so that by carrying the upper end of the indicator to this cut away corner of the dial, the rear pointer 83 may pass in by the said corner from the front or out by the said corner from the rear and thus the doubled indicator can be inserted or removed when the dial is in place.

In scales of this class it is very important that the link at the lower end of the platform supporting rod be properly adjusted. By forming the stud 23 on the inside of the hollow base and securing thereto the malleable bracket 21 to which one end of the said link is pivoted, I provide a cheap and convenient means for adjusting this link. After the parts are in place the thinner portion of the bracket 21 may be bent to carry that end of the link up or down as may be desired and thereby effect the proper adjustment, so that the scale will indicate the correct weight, whether the load on the platform is placed centrally or otherwise. By the special construction of the platform frame and attached marble slab I provide a cheap and compact construction in which no part engages or projects beyond the edges of the slab as in most scales, and one that is convenient to put in place and is not likely to be accidentally displaced. The special construction of the knife edge pivots and other parts relate to economy of production with efficiency in use.

It is apparent that some changes from the specific construction herein disclosed may be made and therefore I do not wish to be understood as limiting myself to the precise form of construction shown and described, but desire the liberty to make such changes, in working my invention, as may fairly come within the spirit and scope of the same.

I claim—

1. In a scale, the combination of a pivoted scale beam with a swinging indicator pivotally mounted on the said scale beam, means for operating the said indicator through the movement of the said scale beam and a stationary dial over the face of which the said indicator swings.

2. In a scale, the combination of a case with a scale beam pivotally mounted thereon, a swinging indicator having a hub by which it is pivotally mounted on the scale beam, and a band connected by one end to the said hub and by its other end to the said case with its middle portion bearing on the periphery of the said hub.

3. The combination of a case with a scale beam pivotally mounted thereon and having two parallel arms at its outer end, a swinging indicator having a hub and pivots by which it is mounted between the said arms of the scale beam, a band connected by one end to the said hub and by its other end to the said case while its middle portion bears on the periphery of the said hub for swinging the indicator in the said fork as the scale beam moves on its fulcrum.

4. The combination of a case with a pivoted scale beam, an indicator pivotally mounted on said scale beam, a cam carried by the said indicator, and a band secured by one end to the said indicator and by its other end to the said case with its middle portion bearing on the said cam, the said cam having its periphery to one side of the pivots of the indicator and the said indicator having its index edge in alinement with the periphery of the said cam.

5. The combination of a case, with a dial having segments of circles indicated thereon, a scale beam pivotally mounted on the said case, an indicator having a straight body portion for moving over the said dial and a hub that is offset to one side out of longitudinal alinement with the said body portion, the said indicator being pivotally mounted on the said scale beam by means of the said offset hub and means for operating the said indicator through the movement of the said scale beam.

6. In a scale, the combination of a scale beam carrying pivotal bearings with an indicator hub having a central bore, an indicator carried by the said hub, a grooved block fitted to the said bore, a counterbalancing rod screwed into the indicator hub with its end bearing on the said grooved block to hold it in place, a knife edge strip within the said grooved block with its ends extending therefrom and resting in the pivotal bearings of the scale beam, and a set screw in the said hub with its inner end bearing on the said knife edge strip for holding it in place.

7. In a scale, the combination of a case with a scale beam carrying pivotal bearings, an indicator hub having a groove therethrough to receive a knife edge strip, an indicator carried by the said hub, a knife edge strip within the groove of the hub with its ends extending therefrom and resting in the pivotal bearings of the scale beam, a set screw in the said hub with its inner end bearing on the said knife edge strip for holding the said strip in place, a cam carried by the said indicator hub, and a band with one end secured to the set screw that holds the knife edge strip and its other end secured to the case while its middle portion bears on the outer edge of the said cam.

8. In a scale, the combination of a case, a scale beam pivotally mounted on the said case, an indicator with a pivotal hub on which the said indicator is mounted, a cam mounted on the said hub and having a peripheral face for an operating band to rest upon, means for adjusting the said cam to move its peripheral face towards and from the pivots of the said indicator hub and a band for operating the said indicator through the movement of the said scale beam.

9. In a scale, the combination of a case, a scale beam pivotally mounted on the said case, an indicator with a flanged hub by means of which the said indicator is pivotally mounted, a cam pivotally mounted by one end on one side of the flange of the said hub and having a peripheral face for an operating band to rest upon, an adjusting screw at the opposite end of the cam from that by which the cam is pivoted, the inner end of the said adjusting screw bearing on one side of the indicator hub and a band for operating the said indicator through the movement of the said scale beam.

10. In a computing scale, the combination of a case with a dial having amounts at various prices per pound indicated thereon in segments of concentric circles, with a scale beam pivotally mounted on the case, an indicator mounted on the scale beam and having price marks thereon, and means for operating the said indicator through the movement of the said scale beam, the center of the concentric circles described by the said indicator being within the range of movement of that end of the scale beam on which the said indicator is mounted, whereby a great range of prices may be indicated within a given height above the scale beam.

11. In a scale, the combination of a case with a scale beam pivotally mounted thereon, an indicator pivotally mounted on the said scale beam, a cam carried by the said indicator, a band with its middle portion in engagement with the said cam, one end of the said band being secured to the said indicator, and a post adjustably mounted on the said case with the other end of the said band secured to the said post.

12. In a scale, the combination of a case with a scale beam pivotally mounted thereon, an indicator pivotally mounted on the said scale beam, a cam carried by the said indicator, and a band of tempered steel with its middle portion in engagement with the said cam while one end is secured to the said indicator and its opposite end is secured to a hook on the said case.

13. In a scale, the combination of knife edge pivots mounted on one part with another part having a cylindrical bore, a longitudinally grooved cylindrical block mounted in the said cylindrical bore with one of the pivots taking its bearing in the groove of the said block, and a set screw in the part having the said cylindrical bore with the end of the said set screw, in engagement with the cylindrical face of the said block.

14. In a scale, the combination of a case having a fan shaped upward extension with a dial of the same form mounted therein and an indicator mounted to oscillate over one face of the said dial and carrying at its upper end a downwardly projecting pointer for moving over the opposite face of the said dial, the said dial having one of its upper corners cut off to permit the introduction and removal of the indicator when the dial is in place within the said case.

15. In a computing scale, the combination of a case comprising a hollow base and an upwardly projecting case extension, with a scale beam pivotally mounted on the said case, an indicator pivotally mounted on the longer end of the said scale beam, means for operating the said indicator through the movement of the said scale beam, a dash pot secured within the said base to the under side of its top, a piston within the said dash pot, and a piston rod connecting the said piston with the said longer end of the scale beam.

16. In a scale, the combination of a pivotally mounted scale beam with an indicator and dial for indicating the weight on the scales from zero up to a given amount, means for operating the said indicator through the movement of the said scale beam, and a weighted arm pivotally mounted on the said scale beam, whereby shifting the weighted arm by swinging it to the opposite side of its pivotal connection with the scale beam adds a given amount to the weight indicated on the dial.

17. In a scale, the combination of a pivotally mounted scale beam with an indicator and dial for indicating the weight from zero up to a given amount, a horizontally swinging arm pivotally mounted by one end on one of the sides of the said scale beam, a weight adjustably mounted on the opposite end of the said arm and means for holding the said arm and weight by the side of said the scale beam when swung towards the scale beam from either side of the pivotal connection with the said beam.

18. In a scale having an indicator pivotally mounted in bearings therefor, the combination of the said indicator bearings with an indicator hub having a cylindrical bore therethrough, an indicator carried by the said hub, a cylindrical block having an acute angled V shaped slot in one side for its whole length, the said block being fitted to the cylindrical bore of the said hub, a knife edge strip fitted to the said V shaped slot and block with its ends projecting therefrom, and means for securing the said knife edge strip and cylindrical block within the bore of the said hub.

GEORGE WALKER.

Witnesses:
  EUGENE DE LONG,
  FRANK T. PUNDERSON.